June 14, 1966  A. C. BAGGENSTOSS  3,256,018
BOWLING BALL AND PROCESS OF MAKING SAME
Filed Aug. 29, 1961
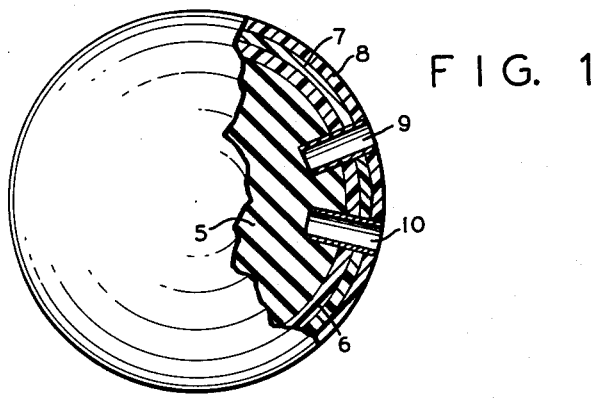
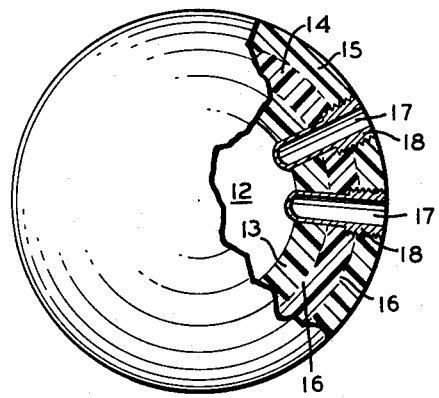
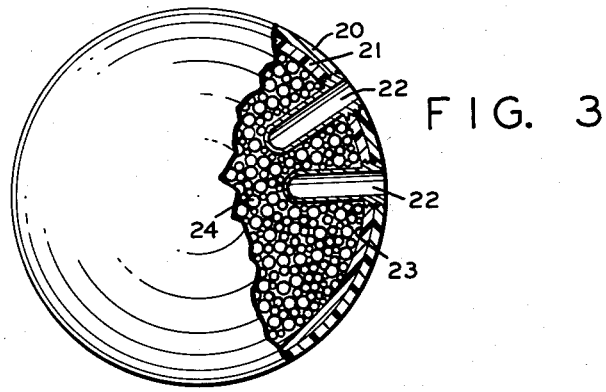
INVENTOR.
ALOIS C. BAGGENSTOSS
BY
ATTORNEY.

United States Patent Office 3,256,018
Patented June 14, 1966

3,256,018
BOWLING BALL AND PROCESS OF
MAKING SAME
Alois C. Baggenstoss, Stamford, Conn., assignor to American Machine & Foundry Company, a corporation of New Jersey
Filed Aug. 29, 1961, Ser. No. 134,707
2 Claims. (Cl. 273—63)

This invention relates to game balls having a hard surface which is subjected to severe impact, including bowling balls, billiard balls, golf balls and the like, and to their method of manufacture. In particular, this invention relates to bowling balls having new and improved construction comprising a synthetic resin surface layer of substantial depth as distinguished from conventional bowling balls surfaced with a hard rubber composition.

Substantially all of the bowling balls currently in use are composed of a variety of core materials having a covering or outer shell surrounding the core, which coverings are usually formed of known compositions such as hard rubber or synthetic resin of appropriate characteristics, e.g., phenol formaldehyde. Due to the nature of compositions which have thus far had acceptable physical properties, bowling balls almost always have a drab, dark color.

Attempts to make lighter colors or variegated surfaces containing small amounts of light colored surface texture with the dark to produce a marbling effect have not been successful because of the incompatibility of the light colored materials with approved bowling ball compositions. Heretofore, no plastic composition which is compatible with various colors has attained any substantial commercial acceptance for use with balls which require a hard, glossy, dirt-resistant surface. Requisites for such balls include non-marking qualities, dirt pick-up resistance, and exceptionally hard surface. At the same time, a suitable composition must be non-brittle to resist extremely severe impact.

It has long been sought to make bowling balls of attractive colors. Heretofore, all efforts to make pastel-colored bowling balls with a variety of plastic materials have been substantially unsuccessful. Rubber balls have continued to be those of commercial superiority. Not only has no synthetic plastic composition achieved acceptance, but those sought to be introduced have been substantially inferior in characteristics to rubber balls. In particular, plastic balls heretofore made have suffered from at least one of two serious drawbacks. On the one hand, the plastic employed, although compatible with various colors, has been too soft. Consequently, the ball abrades relatively easy and has a dirt pick-up problem. Additionally, bowling balls of this type are found to seriously mark the bowling alley. On the other hand, plastic which has been sufficiently hard and provides a ball surface of attractive gloss and dirt pick-up resistance has been incapable of resisting the severe impacts to which it is subjected. These impacts soon chip the surface and render the ball unsatisfactory. Efforts in the prior art have been directed to a single plastic formulation which would provide a satisfactory answer to a synthetic resin ball acceptable in all these characteristics.

In accordance with this invention, I have discovered that by suitably cushioning a hard resinous composition which provides desirable gloss and dirt resistance surface characteristics but which is brittle with a layer of less brittle plastic of the same, or of different but compatible chemical composition, a ball of highly advantageous characteristics which can be manufactured in an unlimited variety of colors is possible. Such resinous compositions per se in thick layers are unsuitable, but in thinner layers when appropriately subsurfaced with a layer of different characteristics provides an advantageous and practical result.

It is therefore the principal object of this invention to provide a game ball having a hard outside surface which is able to withstand severe surface impacts to which the ball is subjected to during play without chipping or cracking.

It is a further object of this invention to provide a bowling ball which has a surface of high and lasting gloss and which has the ability to repel dirt, resist chipping, and is of sufficient surface hardness that it does not mark the bowling alley in use.

It is a further object of this invention to provide bowling balls in a variety of colors which retain their color quality throughout the life of the ball.

Other objects and advantages will become apparent as the more detailed description of the invention develops hereinbelow.

To illustrate the essence of the invention and for a better understanding thereof, reference is made to the accompanying drawings wherein:

FIG. 1 is a bowling ball partially in section illustrating three layers of resin superimposed over a solid core.

FIG. 2 is a bowling ball partially in section illustrating another embodiment in accordance with the invention, comprising a plurality of layers of plastic and having a hollow center.

FIG. 3 illustrates a further embodiment in which the bowling ball partially in section comprises two outer layers filled with expanded cellular plastic.

In general, the invention is concerned with the manufacture of a "composite" bowling ball of synthetic resinous composition in which the essential feature consists of forming a hard outer shell, which of itself is brittle and would chip on impact, supported by an underlying relatively resilient layer which enables the outer shell to withstand the stress of impact on the surface of the ball and prevent damage thereto.

In manufacturing balls in accordance with the invention, a conventional core of material such as rubber; rubber compositions including materials such as cork or resinous compositions including those combining wood chips, flakes or flour or other fillers, together with modifiers such as curing agents, density regulators, etc., may be employed.

As shown in FIG. 1, a conventional rubber core 5, which may include cork or other filler, is used over which is superimposed by any suitable procedure a plurality of layers 6, 7 and 8 of plastic material.

In accordance with the invention, the layer 8 comprises a material of durometer hardness, preferably in the range of from about 80 to 95, and comprises a layer thickness of from about 0.08 inch to about 0.6 inch and preferably varies to some extent with the hardness, i.e. when resinous composition comprising the surface is hardest, the layer is preferably thinnest. References 9 and 10 show conventional finger holes for grasping the ball.

Underlying the hard layer is a substantially more resilient layer 7 which serves to cushion the initial shock applied to the surface.

The advantage of the resilient layer is apparent when the surface of a ball is struck repeatedly full force with a 1.5 pound hammer. The surface having an underlying layer of resilient composition withstands the impact without damage whereas a surface of equal depth comprising throughout its depth uniform hardness invariably chips.

In accordance with the invention, a plurality of layers of resinous composition of varying hardness is contemplated. For this purpose, a third layer 6 underlying the resilient layer 7 is illustrated in FIG. 1. The layer 6 is illustrated as plastic, but it will be obvious that metal may also be substituted. The layer 6 may comprise a composition of hardness greater than the resilient layer 7 or it may comprise a composition of greater resiliency. I have found that depending on the depth of the respective layers, that the layer supporting the resilient or subsurface layer may be either more elastic or more brittle and, in fact, in some instances, may be unnecessary depending on the properties of the core structure. However, it is preferred that at least two surface layers be utilized.

Resiliency, as the term is employed herein, is not limited to flexibility or elastomeric quality. Preferably, it contemplates a high impact, hard but non-brittle, composition as distinguished from the surface layer which is of definite brittleness and, when separated from its underlying resilient support, shatters under impact.

Thus, the structure in FIG. 1 is shown as three discrete layers; although a plurality of layers superimposed in this manner may be employed, the invention is not limited to a structure of this nature. It is only necessary that the hard brittle surface be provided with a sub-layer of greater resiliency.

Preferably, a stratified or graded structure of resinous composition in which the superimposed layer merges into the underlying layer is contemplated. To obtain a structure of this nature, resin is continuously cast so that the outer layer is hard (and of itself brittle) and at least the immediate superimposed layer comprises less brittle, more resilient composition; the change in hardness properties from the surface layer to the sub-layer is a graduated one. To accomplish this, a resin blend of two or more chemical compositions in which the proportion of the components are varied to achieve the desired hardness may be employed. Alternately, a single resinous composition in which the curing conditions or stage is varied to achieve the desirable hardness may be used and cast or otherwise formed into a stratified structure having a hard outer surface supported by an underlying shock-absorbing resilient layer.

As shown in FIG. 2, a bowling ball comprising a hollow center 12 and three graded layers 13, 14 and 15 is illustrated. It will be understood, in view of the foregoing discussion, that the demarcation between layers is shown primarily for the purpose of more clearly describing the invention. Indeed, depending on the method of manufacture and/or the resin composition, the gradation between the layers 13 and 14 and between 14 and 15 may merge as illustrated at 16 or be entirely indistinguishable. Variations in the properties of these strata are ascertained by testing the hardness at radially progressive points in the cross-section of the ball.

The finger holes 17, shown in the embodiment of FIG. 2, having a hollow core, may be made in accordance with the disclosure of U.S. Patent 2,414,672 using a tubular thimble 18 to secure the tubes to the ball.

The hollow center is shown exaggerated in size. It will be apparent that the weight requirements of bowling balls which varies from 10 to 16 pounds must be met. Consequently, when the shell comprising the respective layers having appropriate characteristics has been formed from a given resin formulation, the hollow 12 may vary depending on the ball weight desired. As illustrated in FIG. 3, the center or hollow of the ball may be filled with a predetermined weight of foamable resin composition to provide the exact weight desired. This may be accomplished, for example, by forming surface layers 20 and 21, in that order, as by rotational casting; finishing the ball to standard size; affixing the finger inserts 22 and thereafter injecting through one of the finger inserts a suitable weight of foamable resin 24, such as polyurethane. The resin is then expanded in situ to fill the cavity 23. The resulting ball product comprises a ball of desired weight and provides a measure of strength to the ball. The properties of the cellular plastic 24 may vary as appropriate from rigid foam to flexible or rubbery composition.

*General procedure*

For the purpose of providing more specific details, the manufacture of bowling balls according to the examples provided hereinbelow will be made by one of two procedures; the first employs a core over which layers of synthetic resin are applied in keeping with the inventive concept; in the second procedure a rotational mold is employed, designed so that the resin strata build-up is from the surface of the ball radially inward. It will be apparent that additional procedures in preparing a suitable ball in accordance with the inventive concept comprising a brittle surface supported by a relatively resilient layer may be utilized.

In providing a central core upon which the outer shell, made in accordance with the invention, is applied, any of a variety of conventional compositions and procedures may be used. In general, such cores when used in bowling balls should have a diameter undersized by at least 0.25 inch and preferably 0.35 inch with respect to the finished ball. The following procedure for preparing a core of rubber and cork may be used. It will be understood, however, that the invention is not limited to any particular technique for core formation and that the invention contemplates the use of suitable cores from any known procedure.

*Procedure A.*—A blend of synthetic rubber and cork is molded in a suitable shape with a dense piece of material, such as lead oxide, approximately ¼ inch thick by 4 inches in diameter is inserted in the core to provide for top-balance weight control. In addition to this composition, any one of the core-forming materials described in the patent application of Firth et al., U.S. Serial No. 14,620, filed on March 14, 1960, entitled "Bowling Balls and Methods for Producing Them," may be used. The cores formed in any suitable manner are thereafter positioned into a series of increasingly larger molds, each time casting a spherical layer enveloping the core; at least the layer supporting the surface layer being of increasingly harder material and of substantial uniformity at the surface. At least partial cure between each layer is preferable. The several layers may consist of the same chemical composition prepared in a manner known in the art so as to provide a hard surface coating. The chemical composition may be a blend in which the proportions of components are varied in the respective layers to achieve the desired hardness variation in each layer.

*Procedure B.*—In the second method for producing a ball comprising a plurality of layers as illustrated in FIG. 2 of the drawing, a special rotational mold may be employed in which a resinous composition is injected so that the build-up is from the outside surface (hard brittle material) towards the underlying more resilient layers of strata. It will, of course, be obvious that the strata underlying the outer surface may alternate in hardness, i.e. it is not critical that each strata layer underlying the second resilient strata necessarily be more resilient as the strata is increased radially inward. When the appropriate depth of solid plastic layers has been attained, a foamable plastic may be introduced as illustrated in FIG. 3 into the central cavity and expanded therein. Suitable foamable compositions include, for example, those disclosed in U.S. patent application of Gruss et al., S.N. 31,161, filed on May 23, 1960, entitled "Plastic Bowling Pin." In this embodiment, it will be apparent that a continuous manufacture of bowling balls is possible by continuously mixing an addition of proper resins in suitable order into the rotational mold such as through a conduit into the center of the ball.

In order that the invention may be more fully understood, the following illustrative specific examples are provided. It will be understood that the invention is not to be limited to specific details enumerated. Parts are parts by weight unless otherwise expressed.

EXAMPLE 1

Into a rotary spherical mold having the outer dimension of a bowling ball leaving tolerance for final polishing, i.e. about 8.65 inches diameter and in accordance with procedure B above is introduced sufficient liquid epoxy-polyamine resin suitable to provide a spherical outer layer of about 0.2 inch. Epoxy resins of this type are bisphenol A-epichlorohydrin condensates. These are available commercially from Ciba Products Corp. as Araldite 502 and 6010 and from Shell Chemical Corp. as Epon 815 and 828. Various known polyamines such as ethylenediamine, tetraethylene pentamine, aminoethyl piperazine, etc. may be used. Heat is applied alternately (180°–230° C.) as the mold is rotated. With external heating, the outer skin attains the curing temperature first and cure is initiated. Before the whole mass has set, a mixture of epoxy and urethane in which the ratio epoxy/urethane is gradually enriched in urethane is continuously introduced into the inner periphery until the liquid polymer being introduced when the layer is at about its maximum thickness is pure urethane polymer. Instead of working with the very reactive mixture of diisocyanate with a diamine, a diisocyanate-polyester prepolymer with a suitable diamine is preferably used. The free isocyanate groups in a prepolymer are substantially reduced (4–7%) and its reactivity towards diamines is thus at a practical rate. Typical of suitable polyester-diisocyanate prepolymers are the Adiprenes marketed by E. I. du Pont de Nemours & Co. A layer of 1.8 inches overall is formed. The shell is then cured at 180° C. for 4 hours. No noticeable indentation is apparent when on the ball surface the ball is struck with a 1.5 pound hammer full force. Cross-sections of the shell gave a durometer reading of 89 at the surface, 67 at ⅜ inch below the surface and 47 at a point 1½ inches from the surface. The cavity of the ball is then filled with the appropriate quantity of polyurethane foamable resin to provide a ball of desired weight. The balls prepared, as above, prior to filling with foam, are comparable in weight, e.g. about 9 pounds. A sufficient weight of foamable resin is introduced to completely fill the cavity and provide balls in weight varying from 10 to 16 pounds. Suitable foamable compositions and procedure are disclosed in the pending U.S. patent application of Gruss et al., Serial No. 31,161, filed on May 23, 1960, entitled, "Plastic Bowling Pin."

EXAMPLE 2

The importance of a continuous or gradient hardening towards the outside is demonstrated by the following.

A ⅜ inch layer of hard epoxy having a Shore D hardness of 89 is cast on top of a ⅛ inch soft polyurethane layer (Shore D hardness 40–45). This test piece had good surface hardness but broke under impact with a hammer. A test piece in which four ⅛ inch layers of resin of increasing softness comprising (1) a surface layer of epoxy Shore D hardness 89; (2) epoxy:urethane 2:1 (Shore D hardness 70–72); (3) urethane:epoxy (2:1) Shore D hardness 55–60; and (4) urethane alone (Shore D hardness 40–45) withstood hammer impact without apparent damage.

This demonstrates that in a given depth, the hard layer can be too thick or the cushioning too late. For this reason, gradual or stratified cushioning is most preferable.

A system of alternate hard and soft multi-layer strata, each layer of which is of suitable depth so that when severely impacted, the hard or brittle layer will flex rather than shatter, is also contemplated. It is necessary in all structures, however, that the outer case or layer be of sufficiently hard material to resist scratching and loss of material by abrading against the hard wood surfaces of the bowling alley.

EXAMPLE 3

An undersized core of rubber and cork, prepared in the manner of procedure A above, is placed in a series of molds so as to add consecutive layers of ¼", 3/16" and ⅛" layers of (1) flexible polyester-styrene blends,[1] ratio 50:50, (2) polyurethane epoxy blends,[2] ratio 60:40 with (3) a top layer of epoxy,[3] respectively. Balls of pastel shades of blue, yellow, and pink are prepared using epoxy resin appropriately pigmented. This composition permits the manufacture of balls of any of a wide variety of colors. When struck with a hammer, no apparent damage to the surface was evident. The surface had a Shore D hardness of 91, a hardness at a depth of 3/16" of 69–71 and a hardness of 47–50 at ⅜" depth.

EXAMPLE 4

The procedure of Example 3 was substantially repeated with the exception that an outer layer of polycarbonate available as Lexan from the General Electric Co. was employed. A surface Shore D hardness of 89 is obtained in lieu of the epoxy surface composition of Example 3.

In finishing the ball, the standard procedure known in the art may be used. For example, after the ball has been removed from the mold, it may be turned down in a lathe, placed in a mercury bath having a shape of a concave hemisphere of a greater diameter than the diameter of the ball and the ball positions itself at once so that the ball seeks its lower center of gravity. After the ball has oriented itself, the ball is secured while a pin in the mercury bath indents the ball indicating the heavy side for drilling of the finger holes or grips.

EXAMPLE 5

A three layer ball surface system was formulated, using varying proportions of general purpose epoxy monomer (A) and a modified epoxy monomer (B). (A) is a bisphenol-chlorohydrine epoxy[4] producing a hard plastic when reacted with an organic base, whereas (B) is a polyether modified epoxy[5] resulting in a rubbery, soft plastic when reacting with the same base as (A) (Ciba's Araldite 431 and 437). The formulation of the layers and the diameter of the ball after each layer was applied are given in Table I.

First layer I was cast around a wooden core in a mold, partly cured and turned down to leave a layer of 0.2 inch thickness over the core. This was repeated for the second layer to provide a layer of like thickness and finally, after the third layer, the ball was buffed and polished. It produced an epoxy covered core which provided a very satisfactory hardness gradient from the core to the ball surface. In this experiment, the pigment and opacity agent were evenly distributed among the layers.

TABLE I

| | Layer I | Layer II | Layer III |
|---|---|---|---|
| Final diameter, in | 7.8 | 8.2 | 8.59 |
| Formulation: | | | |
| Parts Araldite 6010 | 25 | 35 | 90 |
| Parts Araldite 431 | 75 | 65 | 10 |
| Parts n-aminoethylpiperazine | 7.8 | 8.5 | 12.4 |
| Parts pigment and opacity agent (chromophthal colors and TiO₂) | 1.2 | 1.2 | 1.2 |
| Shore D Hardness | 67 | 77 | 87 |

[1] Available as Plaskon 9713 from Allied Chemical & Dye Corp. and as Vibrin 156 from Naugatuck Chemical Div. of U.S. Rubber Co.
[2] Dupont Adiprene 100 and Ciba Araldite 6010 condensed with diphenyl-dichloro-diamine methylene as curing agent.
[3] Epon 830 of Shell Chemical Corp.
[4] Shell Epon resin 830; also Ciba Araldite 6010.
[5] Ciba Araldite 431 and 437.

This ball had good impact strength and abrasion resistance. It had greater resilience than a ball with a thick shell of filled epoxy resin. The surface composition permitted polishing to a very high gloss.

EXAMPLE 6

A wooden core is rotated in two planes and while rotating a liquid plastic mix is poured onto the core while heating the mass. The molding apparatus employed is available from Preform Mold Co. of Cuyahoga Falls, Ohio.

A three layer system was formulated using a general purpose bisphenol-epichlorohydrin resin (Shell Epon 815) and a prepolymerized and stabilized isocyanate (du Pont Adiprene L-167).[1] In this experiment, only a soluble

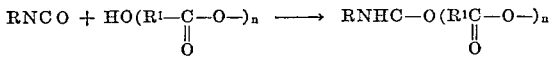

Whereas Adiprenes such as L 100 giving soft endproducts have the following general formula:

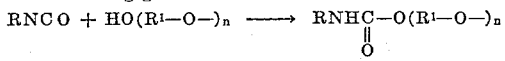

dye was used in the outermost layer and a pigment and opacity agent were used in the two underlying layers. The formulations of the layers and the diameter of the ball after each layer was applied are given in the table below.

|  | Layer I | Layer II | Layer III |
|---|---|---|---|
| Final Diameter | 7.8 | 8.3 | 8.65 |
| Formulation: |  |  |  |
| Parts Epon 815 | 35 | 43 | 60 |
| Parts Adiprene L-167 | 65 | 57 | 40 |
| Parts Diamine, i.e. 4,4'diamino-3'3'dichloro-diphenyl methylene or diamino diphenyl sulfone | 24 | 27 | 34 |
| Parts pigment and opacity agent | 1.3 | 1.3 |  |
| Parts dye |  |  | 0.05 |
| Shore D hardness | 43 | 65 | 85 |

This ball had a high gloss when polished to a final diameter of 8.59 inches; it was highly resistant to abrasion, and had good resistance to impact.

EXAMPLE 7

The formulation of Example 6 is again used but the procedure is modified by spraying the resinous liquid onto the rotating core instead of flow coating. A very satisfactory product having properties very similar to those described for the ball of Example 6 is obtained.

EXAMPLE 8

A bowling ball was made using a mixture of components A and B. A is a rigid polyester[2] (phthalic anhydride plus propylene glycol) and B is a flexible polyester.[3]

A 7.8 inch core was rotated in an oven at 220° F. and a mixture of 40 parts Vibrin 156 or 60 parts Vibrin 121, 0.5 part benzoyl peroxide, and 0.2 part 6% Cobalt naphthenate were sprayed onto the core. As the spraying proceeded, Vibrin 156 containing 0.5 part benzoyl peroxide and 0.2 part 6% Cobalt naphthenate per 100 parts was slowly added to the polyester mixture. When the spraying and curing were completed, the ball was ground to size and polished. The finished ball had good surface gloss and hardness and satisfactory resilience to sharp impact.

EXAMPLE 9

Over a rubber-cork core which has not been cured to completion, is compression molded a ⅛ inch thick layer of the following mixture:

| | Parts |
|---|---|
| Smoked sheet rubber | 100 |
| Zinc oxide | 5 |
| Sulfur | 7 |
| Styrene-butadiene 90:10 polymer | 20 |

Partial, but not complete, vulcanization is effected. A second layer of 3/16 inch of the following composition is compression molded:

| | Parts |
|---|---|
| Smoked sheet rubber | 100 |
| Zinc oxide | 5 |
| Sulfur | 3 |
| Styrene-butadiene 90:10 | 45 |

Heat is now applied for 10 hours until vulcanization is complete. The respective layers comprise an integral part of the core due to vulcanization of the sulfur across the layer boundary, including the core. Outside hardness is 76 (Shore D) and the plastic blend is not appreciably dulled by the small amount of sulfur. This composition, provided the sulfur is kept below about 6%, can be pigmented to bright pastel shades. The outside layer is cushioned by a relatively soft rubbery substrate.

EXAMPLE 10

An 8-inch core is sprayed with a pigmented coat of epoxy resin. The core is now place into an 8.2 inch mold with proper spacing. A monomeric mixture of 70% methylmethacrylate and 30% ethylmethacrylate and 0.1% benzoyl peroxide is cast and cured for 6 hours at 65° C. The sphere is now placed into an 8.4 inch mold and the following layer is cast (layer #2) in the same manner.

| | Parts |
|---|---|
| Methylmethacrylate | 100 |
| Divinyl benzene | 0.05 |
| Benzoyl peroxide | 0.1 |

The third layer (#1), cast in a 8.6 inch mold, consists of:

| | Parts |
|---|---|
| Methylmethacrylate | 100 |
| Divinyl benzene | 0.2 |
| Benzoyl peroxide | 0.1 |

The layers adhere well to each other. The respective layers have the following differences in hardness, Shore D.

| | |
|---|---|
| Layer #3 | 52 |
| Layer #2 | 78 |
| Layer #1 | 93 |

This ball is characterized by its glass-like transparency. It has good impact and dirt pick-up resistance.

EXAMPLE 11

Using the following composition a ¼ inch thick hollow sphere is rotationally cast:

100 parts Adiprene LD 167 (described hereinbefore)
25 parts dichlorodiaminodiphenyl methylene.

The casting is cured for 2 hours at 210° F. The sphere is removed from the mold and hot air (350° F.) is introduced for 4 hours through a ¼ inch hole in the sphere, while cooling the outside. The inside of the sphere becomes softer and more flexible due to decomposition. The ball has an outside hardness of 78 and an inside hardness of 63. The sphere is filled with plastic and filler or a foamed material depending on the weight requirements. The outer shell inward has a continuous graduated change in hardness.

---

[1] Adiprenes of this type are prepolymerized isocyanates containing approximately 4-5% per isocyanate groups which are still able to react to completion and to bring the liquid prepolymer to the final solid stage. In general, polyester-isocyanate prepolymers will result in hard elastomers, while polyglycol-isocyanates and carboxylic acid-isocyanates result in soft elastomers. In the former category are such Adiprenes like LD 167, 213, 305, yielding hard vulcanizates having the following general formula:

[2] Vibrin 156 of Naugatuck Chemical Div. of U.S. Rubber Co.

[3] Vibrin 121. Flexible polyesters can also be obtained when the anhydride (phthalic, maleic, etc.) is condensed with a polyether glycol instead of propylene glycol. Other flexible polyesters include those described in Example 3.

It will be apparent to those skilled in the art that various modifications may be made in the invention without departing from the scope of the invention. Accordingly, the invention is not to be limited except insofar as necessitated by the appended claims.

What is claimed is:

1. A method of making a bowling ball comprising the steps of: placing a core in a suitable mold, surrounding said core with a resin substrate layer of relatively resilient resinous composition, and then applying thereon a surface layer of epoxy-urethane copolymer, said surface layer having the character, when cured, of greater hardness than the resin substrate layer over which it is superimposed.

2. A bowling ball comprising a shell consisting of a plurality of layers of synthetic resin composition, said shell being characterized by having a relatively thin outer layer of a hard resinous epoxy-urethane copolymer and, underlying said outer layer, a cushioning sublayer of relatively resilient resinous composition.

References Cited by the Examiner

UNITED STATES PATENTS

| | | | |
|---|---|---|---|
| 1,518,130 | 12/1924 | Barach | 273—63 |
| 2,166,950 | 7/1939 | German et al. | |
| 2,202,674 | 5/1940 | Seaman et al. | 273—82 |
| 2,876,011 | 3/1959 | Hunt | 273—82 |
| 2,968,485 | 1/1961 | Aler | 273—82 |
| 3,018,106 | 1/1962 | Satchell et al. | 273—82 |
| 3,147,975 | 9/1964 | Gruss et al. | |

FOREIGN PATENTS

| | | |
|---|---|---|
| 641,073 | 5/1962 | Canada. |

RICHARD C. PINKHAM, *Primary Examiner.*

LEONARD W. VARNER, JR., LOUIS R. PRINCE, W. R. BROWNE, *Assistant Examiners.*